United States Patent
Zhang

(10) Patent No.: US 8,839,017 B2
(45) Date of Patent: Sep. 16, 2014

(54) ELECTRONIC DEVICE AND METHOD FOR DETECTING POWER STATUSES OF ELECTRONIC DEVICE

(75) Inventor: Yu-Gang Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 386 days.

(21) Appl. No.: 13/337,123

(22) Filed: Dec. 25, 2011

(65) Prior Publication Data
US 2012/0311368 A1 Dec. 6, 2012

(30) Foreign Application Priority Data
Jun. 3, 2011 (CN) .......................... 2011 1 0148876

(51) Int. Cl.
*G06F 11/00* (2006.01)
*G06F 11/30* (2006.01)
*G06F 15/177* (2006.01)
*G06F 1/28* (2006.01)
*G06F 11/20* (2006.01)

(52) U.S. Cl.
CPC .............. *G06F 1/28* (2013.01); *G06F 11/3062* (2013.01); *G06F 11/3055* (2013.01); *G06F 11/2015* (2013.01)
USPC .................. 713/340; 713/1; 713/300; 714/48

(58) Field of Classification Search
CPC ......... G06F 1/28; G06F 1/30; G06F 11/2015; G06F 11/3055
USPC .............................. 713/1, 2, 300, 340; 714/48
See application file for complete search history.

(56) References Cited

U.S. PATENT DOCUMENTS

| | | | |
|---|---|---|---|
| 5,396,637 A * | 3/1995 | Harwell et al. ............... | 365/228 |
| 7,418,613 B2 * | 8/2008 | Hirai .............................. | 713/340 |
| 8,077,741 B2 * | 12/2011 | Takahashi et al. ............ | 370/468 |
| 2004/0179334 A1 * | 9/2004 | Kinnard et al. ............... | 361/687 |
| 2011/0307731 A1 * | 12/2011 | Tsao ............................. | 713/340 |

\* cited by examiner

*Primary Examiner* — Mark Connolly
(74) *Attorney, Agent, or Firm* — Novak Druce Connolly Bove + Quigg LLP

(57) ABSTRACT

In a method for detecting power statuses of one or more power supplies in an electronic device. The method detects a power status of each power supply at a first time cycle when a baseboard management controller (BMC) of the electronic device is started up, and stores all the detected power statuses into the BMC. The method determines a change value of the power status of each power supply at a second time cycle by analyzing the detected power statuses of each power supply stored in the BMC, and stores the change value of the power status of each of the power supplies in the BMC.

19 Claims, 5 Drawing Sheets

ELECTRONIC DEVICE AND METHOD FOR DETECTING POWER STATUSES OF ELECTRONIC DEVICE

BACKGROUND

1. Technical Field

Embodiments of the present disclosure relate to power management technology, and particularly to an electronic device and method for detecting statuses of one or more power supplies in the electronic device.

2. Description of Related Art

One or more power supplies are installed in an electronic device (e.g., a server) to provide reliable power. A baseboard management controller (BMC) of the electronic device is used to detect a power status of each power supply through a power management bus. If one of the power supplies is shut down (abnormal status), the BMC records an error message. An administrator may select one of the number of other power supplies to provide power to the electronic device, and remove or shut down a redundant power supply.

In this situation, the administrator must set a quantity of the power supplies manually to tell the BMC how many power supplies should be detected. If the administrator doesn't set the quantity of the power supplies which need to be detected, the BMC will output an error message when the redundant power supplies are detected and found to be working abnormally (e.g., removed or shut down). It is an inconvenient and results in mistakes because of human error during the setting operation. Therefore, a more efficient method for detecting the status of all possible parts of the power supplies for an electronic device is desired.

DETAILED DESCRIPTION

All of the processes described below may be embodied in, and fully automated via, functional code modules executed by one or more general purpose electronic devices or processors. The code modules may be stored in any type of non-transitory computer-readable medium or other storage device. Some or all of the methods may alternatively be embodied in specialized hardware. Depending on the embodiment, the non-transitory computer-readable medium may be a hard disk drive, a compact disc, a digital video disc, a tape drive or other suitable storage medium.

Figure 1:
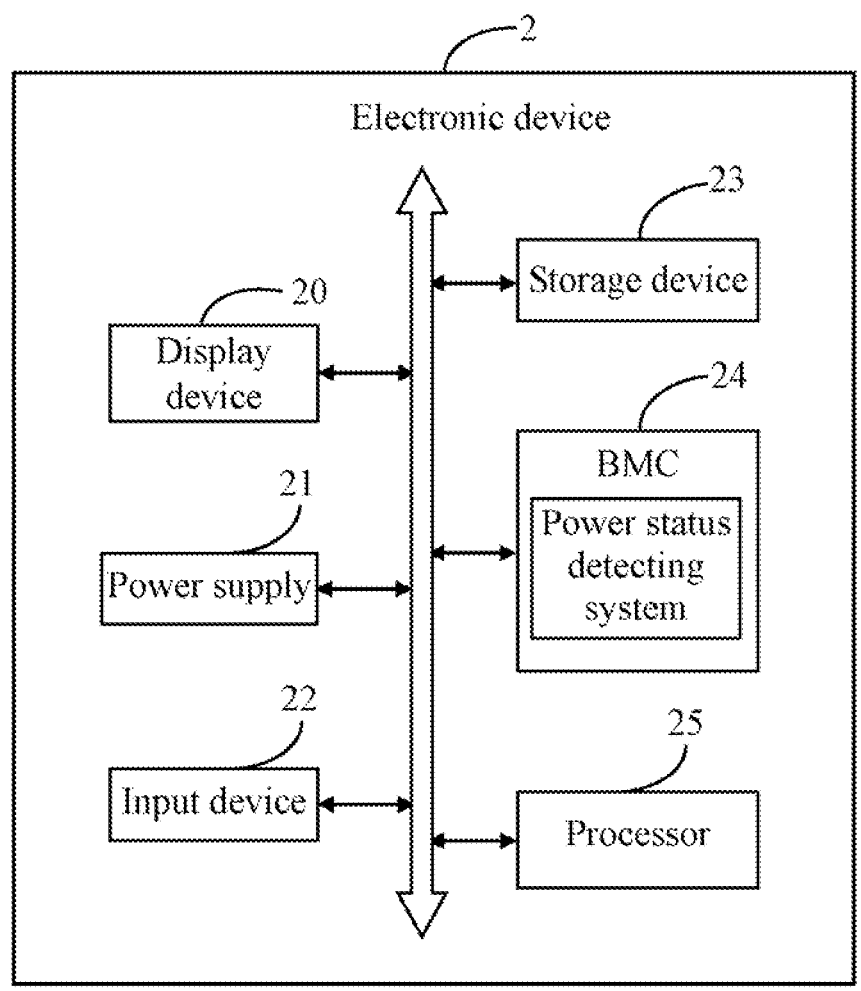
FIG. 1 is a block diagram of one embodiment of an electronic device including a power status detecting system.

FIG. 1 is a block diagram of one embodiment of an electronic device 2 including a power status detecting system 200. In the embodiment, the power status detecting system 200 is stored in a baseboard management controller (BMC) 24 of the electronic device 2. The electronic device 2 further includes a display device 20, one or more power supplies 21 (only one is shown in FIG. 1), an input device 22, a storage device 23, and at least one processor 25. The electronic device 2 may be a computer, a server, a tablet device, a mobile phone, or any other computing device. FIG. 1 illustrates only one example of the electronic device 2 that may include more or fewer components than as illustrated, or a different configuration of the various components may exist in other embodiments.

The display device 20 may be a liquid crystal display (LCD) or a cathode ray tube (CRT) display, and the input device 22 may be a mouse, a keyboard, a touch screen, and/or a touchpad used to input computer readable data.

The power status detecting system 200 is used to detect a power status of each power supply 21 in an electronic device 2, and record a change in the power status of each power supply 21 in the storage device 23. In one embodiment, the power status detecting system 200 may include computerized instructions in the form of one or more programs that are executed by the at least one processor 25 and stored in the storage device 23 (or other memory). A detailed description of the power status detecting system 200 will be given.

Figure 2:
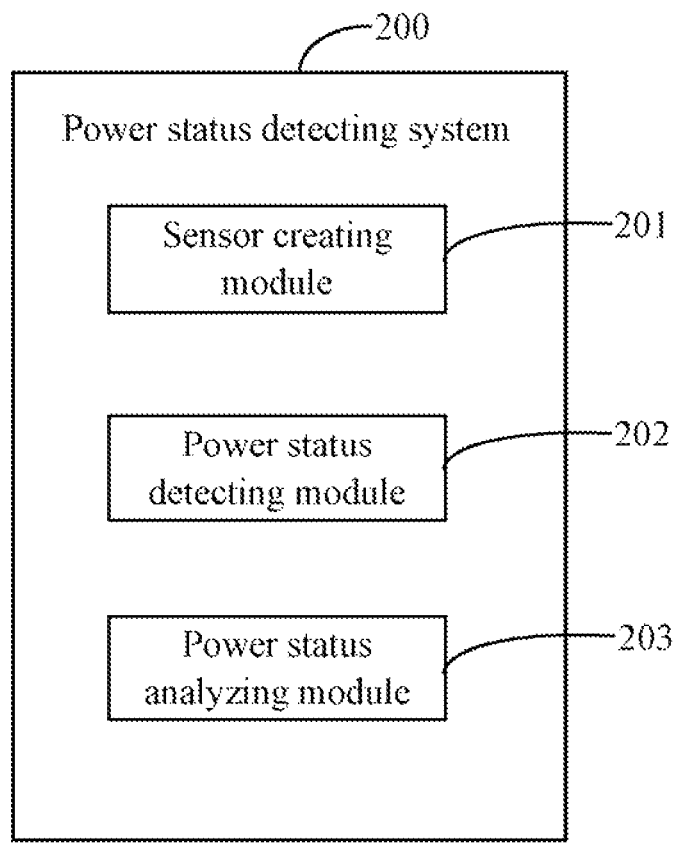
FIG. 2 is a block diagram of function modules of the power status detecting system included in the electronic device.

FIG. 2 is a block diagram of function modules of the power status detecting system 200 included in the electronic device 2. In one embodiment, the power status detecting system 200 may include one or more modules, for example, a sensor creating module 201, a power status detecting module 202, and a power status analyzing module 203. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

Figure 3:
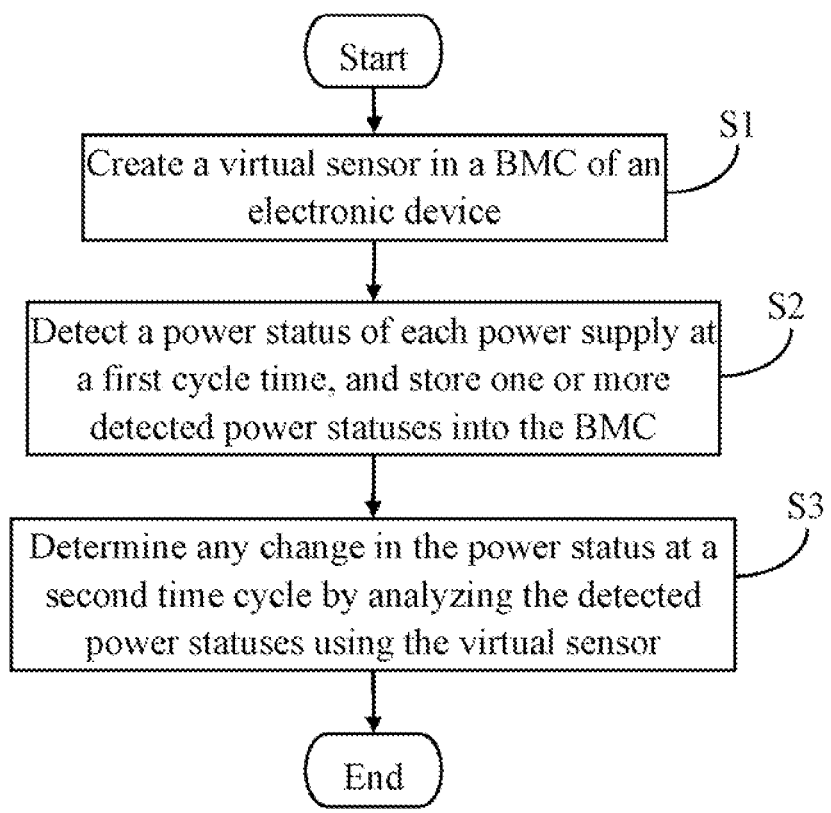
FIG. 3 is a flowchart of one embodiment of a method for detecting power statuses of one or more power supplies in an electronic device.

FIG. 3 is a flowchart of one embodiment of a method for detecting power statuses of one or more power supplies in an electronic device, such as the electronic device 2 of FIG. 1. Depending on the embodiment, additional blocks may be added, others removed, and the ordering of the blocks may be changed.

In block S1, the sensor creating module 201 creates a virtual sensor in the BMC 24. In one embodiment, the virtual sensor includes a plurality of software modules for detecting power statuses of each power supply 21 at preset intervals. As an example, the virtual sensor may be stored in a firmware of the BMC 24.

In block S2, the power status detecting module 202 detects a power status of each power supply 21 at a first time cycle "T1" (e.g., one second) when the BMC 24 is started up, and stores one or more detected power statuses into the BMC 24. A detailed description is given in FIG. 4.

In one embodiment, the power status of the power supply 21 may include one status defined as normal status and another status defined as abnormal. The normal status is a normal working status when the power supply 21 provides power to the electronic device 2, and the abnormal status is any other status, including the power supply 21 being shut down or removed. The normal status is recorded as a first preset value, and the abnormal status is recorded as a second preset value. For example, the first preset value is represented by a digital "1", and the second preset value is represented by a digital "0".

In block S3, the power status analyzing module 203 determines any change in the power status of each power supply 21 at a second time cycle (e.g., two seconds) by reference to the virtual sensor, and stores the value, as hereafter established, of the change (change value) in the BMC 24. In one embodiment, the change value of the power status of each power supply 21 is determined by analyzing the detected power status of each power supply stored in the BMC 24. In other embodiments, the power status analyzing module 203 may determine any change value of the power status of each power supply 21 using a physical sensor. That is to say, in other embodiments, block S1 may be removed. A detailed description of block S3 is given in FIG. 5.

In one embodiment, a longer period is applied to the second time cycle than to the first time cycle. For example, T2=2*T1. The change value of the power status of each power supply 21 is determined as follows. If the power status of one of the power supplies 21 is changed from the first preset value to the second preset value during two sequential first time cycles, the power status analyzing module 203 determines that the power status of the power supply 21 has changed from the normal status to the abnormal status.

If the power status of one of the power supplies 21 is changed from the second preset value to the first preset value during two sequential first time cycles, and a previous power status of the power supply 21 recorded in the BMC 24 is the abnormal status, the power status analyzing module 203 determines that the power status of the power supply 21 has changed from the abnormal status to the normal status.

Figure 4:
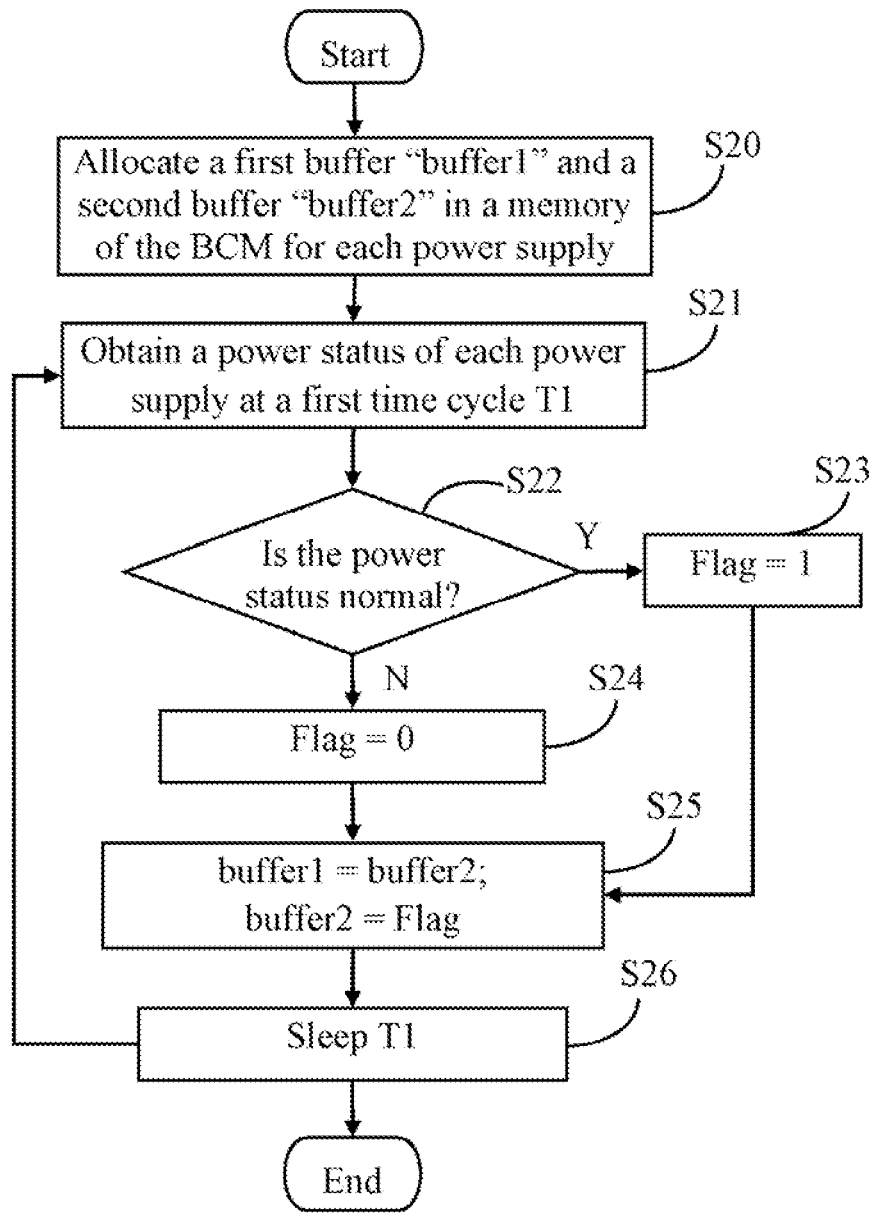
FIG. 4 is a detailed flowchart of block S2 in FIG. 3.

FIG. 4 is a detailed flowchart of block S2 in FIG. 3. Depending on the embodiment, additional blocks may be added, others removed, and the ordering of the blocks may be changed.

In block S20, the power status detecting module 202 allocates a first buffer "buffer1" and a second buffer "buffer2" in a memory of the BMC 24 for each power supply 21 when the BMC 24 is started up.

In block S21, the power status detecting module 202 obtains a power status of each power supply 21 at the first time cycle through a power management bus of the BMC 24.

In block S22, the power status detecting module 202 determines if the power status of each power supply 21 is the normal status.

In block S23, if the power status of one of the power supplies 21 is the normal status, the power status detecting module 202 sets a value of a marked variable "Flag" as the first preset value (e.g., Flag=1), then the procedure goes to block S25.

In block S24, if the power status of one of the power supplies 21 is the abnormal status, the power status detecting module 202 sets the value of the marked variable "Flag" as the second preset value (e.g., Flag=0), then the procedure goes to block S25.

In block S25, the power status detecting module 202 moves data stored in the second buffer "buffer2" to the first buffer "buffer1," and stores the value of the marked variable "Flag" into the second buffer "buffer2" (buffer1=buffer2, and buffer2=Flag). That is to say, the second buffer "buffer2" is used to store a current power status of the power supply 21, and the first buffer "buffer1" is used to store a previous power status of the power supply 21.

In block S26, the power status detecting module 202 controls the power status detecting system 200 to keep a sleep status for the first time cycle "T1," then the procedure returns to block S21.

Figure 5:
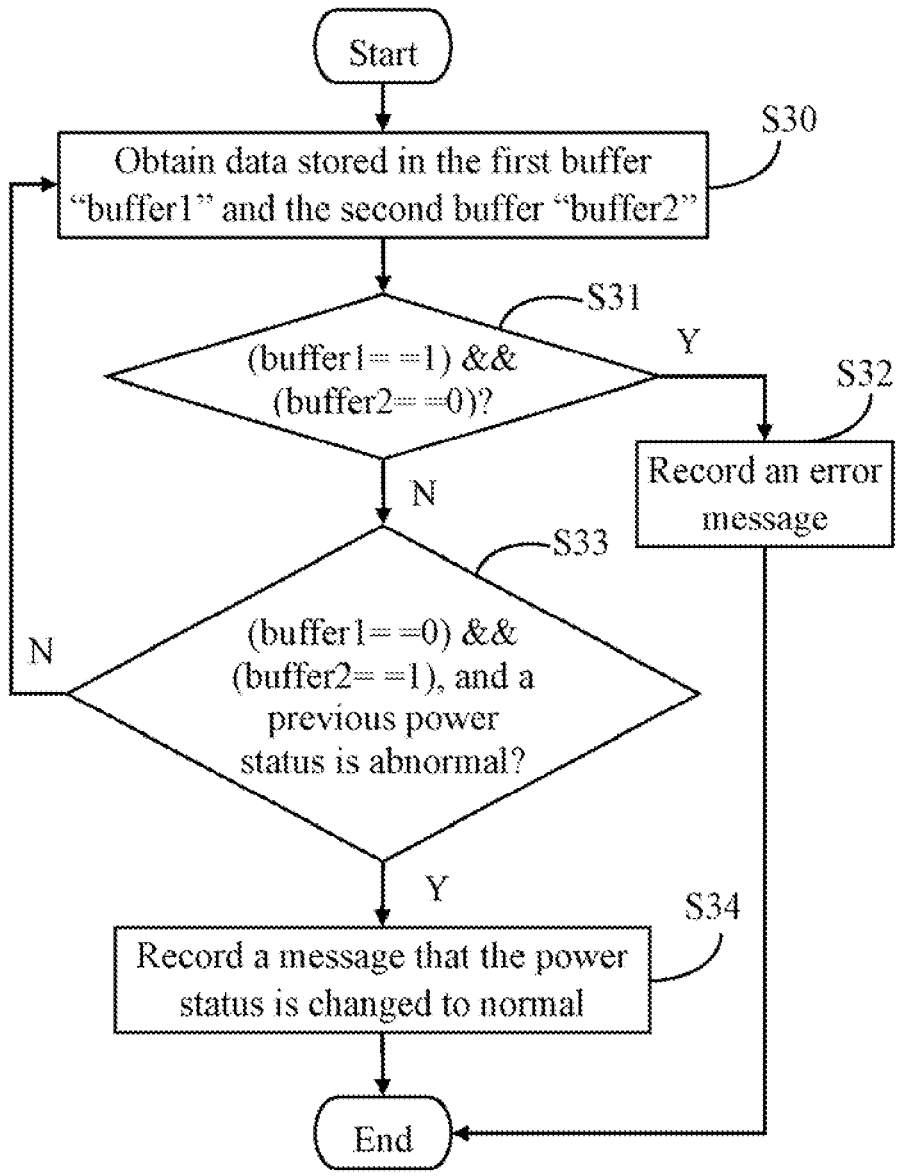
FIG. 5 is a detailed flowchart of block S3 in FIG. 3.

FIG. 5 is a detailed flowchart of block S3 in FIG. 3. Depending on the embodiment, additional blocks may be added, others removed, and the ordering of the blocks may be changed.

In block S30, the power status analyzing module 203 obtains data stored in the first buffer "buffer1" and the second buffer "buffer2" of each power supply 21 at the second time cycle "T2" using the virtual sensor or the physical sensor.

In block S31, the power status analyzing module 203 determines if the data stored in the first buffer and the second buffer of each power supply 21 meet a first condition. In one embodiment, the first condition is that the data stored in the first buffer is equal to the first preset value and the data stored in the second buffer is equal to the second preset value (i.e., (buffer1==1)&&(buffer2==0)). If the first condition is satisfied, the procedure goes to block S32. If the first condition is not satisfied, the procedure goes to block S33.

In block S32, the power status analyzing module 203 records an error message in a log file of the BCM 24. Furthermore, the BMC 24 may output the error message by means of a warning lamp and/or audibly to prompt an administrator who operates the electronic device 2. That is to say, if the power status of one of the power supplies 21 is changed from the first preset value to the second preset value during two sequential first time cycle (i.e., (buffer1==1)&& (buffer2==0)), the power status analyzing module 203 determines that the power status of the power supply 21 has changed from the normal status to the abnormal status, and records an error message in the log file.

If a unit or a part of the power supplies is removed before the BMC 24 is started up, the power status of each of the removed power supplies 21 is not changed as a result (i.e., (buffer1==0)&&(buffer2==0)), the power status analyzing module 203 does not record an error message concerning the unit or part removed from the power supplies 21, and the BMC 24 does not output an error messages because the power status of each removed unit or part is not changed. Thus, there is no need to preset the quantity of the power supplies which need to be detected when part or one unit of the power supplies 21 is removed from the electronic device 2.

In block S33, the power status analyzing module 203 determines if the data stored in the first buffer and the second buffer of each power supply 21 meet a second condition. In one embodiment, the second condition is that the data stored in the first buffer is equal to the second preset value, the data stored in the second buffer is equal to the first preset value (i.e., (buffer1==0)&&(buffer2==1)), and a previous power status of the power supply 21 recorded in the log file of the BMC 24 is the abnormal status. If the second condition is satisfied, the procedure goes to block S34. If the second condition is not satisfied, the procedure returns to block S30.

In block S34, the power status analyzing module 203 determines that the power status of one of the power supplies 21 has changed from the abnormal status to the normal status, and records a message in the log file of the BMC 24 that the power status of the power supply 21 has changed to normal. That is to say, if the power status of one part or unit of the power supply 21 changes from the second preset value to the first preset value during two sequential first time cycle (i.e., (buffer1==0)&&(buffer2==1)), and the previous power status of the power supply 21 recorded in the log file of the BMC 24 is the abnormal status, the power status analyzing module 203 records a message that the power status of the power supply 21 has changed from the abnormal status to the normal status.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computer-implemented method for detecting power statuses of one or more power supplies in an electronic device, the method comprising:
   detecting a power status of each of the power supplies at a first time cycle when a baseboard management controller (BMC) of the electronic device is started up, and storing one or more detected power statuses into the BMC; and
   determining a change value of the power status of each of the power supplies at a second time cycle by analyzing the detected power statuses of each of the power supplies stored in the BMC, and storing the change value of the power status of each of the power supplies in the BMC.

2. The method according to claim 1, wherein the power status of the power supply comprises a normal status and an abnormal status, the normal status being recorded as a first preset value, and the abnormal status being recorded as a second preset value.

3. The method according to claim 2, wherein the detecting step comprises:
   allocating a first buffer and a second buffer in a memory of the BMC for each of the power supplies when the BMC is started up;
   obtaining a power status of each of the power supplies at the first time cycle through a power management bus of the BMC;
   setting a value of a marked variable as the first preset value upon the condition that the power status of one of the power supplies is the normal status, or setting the value of the marked variable as the second preset value upon the condition that the power status of one of the power supplies is the abnormal status; and
   moving data stored in the second buffer to the first buffer, and storing the value of the marked variable into the second buffer.

4. The method according to claim 2, wherein the change value of the power status of each of the power supplies is determined by:
   determining that the power status of one of the power supplies has changed from the normal status to the abnormal status upon the condition that power status is changed from the first preset value to the second preset value during two sequential first time cycles; or
   determining that the power status of one of the power supply has changed from the abnormal status to the normal status upon the condition that power status is changed from the second preset value to the first preset value during two sequential first time cycles, and a previous power status of the power supply recorded in the BMC is the abnormal status.

5. The method according to claim 2, wherein the first preset value is represented by a digital "1", and the second preset value is represented by a digital "0".

6. The method according to claim 1, wherein the second time cycle is greater than the first time cycle.

7. An electronic device, comprising:
   a baseboard management controller (BMC);
   a storage device;
   at least one processor; and
   one or more modules that are stored in the storage device and executed by the at least one processor, the one or more modules comprising:
   a power status detecting module that detects a power status of each of the power supplies at a first time cycle when a baseboard management controller (BMC) of the electronic device is started up, and stores one or more detected power statuses into the BMC; and
   a power status analyzing module that determines a change value of the power status of each of the power supplies at a second time cycle by analyzing the detected power statuses of each of the power supplies stored in the BMC, and stores the change value of the power status of each of the power supplies in the BMC.

8. The electronic device according to claim 7, wherein the power status of the power supply comprises a normal status and an abnormal status, the normal status being recorded as a first preset value, and the abnormal status being recorded as a second preset value.

9. The electronic device according to claim 8, wherein the power status detecting module detects a power status of each of the power supplies by:
   allocating a first buffer and a second buffer in a memory of the BMC for each of the power supplies when the BMC is started up;
   obtaining a power status of each of the power supplies at the first time cycle through a power management bus of the BMC;
   setting a value of a marked variable as the first preset value upon the condition that the power status of one of the power supplies is the normal status, or setting the value of the marked variable as the second preset value upon the condition that the power status of one of the power supplies is the abnormal status; and
   moving data stored in the second buffer to the first buffer, and storing the value of the marked variable into the second buffer.

10. The electronic device according to claim 8, wherein the change value of the power status of each of the power supplies is determined by:
    determining that the power status of one of the power supply has changed from the normal status to the abnormal status upon the condition that power status is changed from the first preset value to the second preset value during two sequential first time cycles; or
    determining that the power status of one of the power supply has changed from the abnormal status to the normal status upon the condition that power status is changed from the second preset value to the first preset value during two sequential first time cycles, and a previous power status of the power supply recorded in the BMC is the abnormal status.

11. The electronic device according to claim 8, wherein the first preset value is represented by a digital "1", and the second preset value is represented by a digital "0".

12. The electronic device according to claim 7, wherein the second time cycle is greater than the first time cycle.

13. A non-transitory storage medium having stored thereon instructions that, when executed by a processor of an electronic device, causes the electronic device to perform a method for detecting power statuses of one or more power supplies in an electronic device, the method comprising:
    detecting a power status of each of the power supplies at a first time cycle when a baseboard management controller (BMC) of the electronic device is started up, and storing one or more detected power statuses into the BMC; and
    determining a change value of the power status of each of the power supplies at a second time cycle by analyzing the detected power statuses of each of the power supplies stored in the BMC, and storing the change value of the power status of each of the power supplies in the BMC.

14. The non-transitory storage medium according to claim 13, wherein the power status of the power supply comprises a normal status and an abnormal status, the normal status being recorded as a first preset value, and the abnormal status being recorded as a second preset value.

15. The non-transitory storage medium according to claim 14, wherein the detecting step comprises:
    allocating a first buffer and a second buffer in a memory of the BMC for each of the power supplies when the BMC is started up;
    obtaining a power status of each of the power supplies at the first time cycle through a power management bus of the BMC;
    setting a value of a marked variable as the first preset value upon the condition that the power status of one of the power supplies is the normal status, or setting the value of the marked variable as the second preset value upon the condition that the power status of one of the power supplies is the abnormal status; and
    moving data stored in the second buffer to the first buffer, and storing the value of the marked variable into the second buffer.

16. The non-transitory storage medium according to claim 14, wherein the change of the power status of each of the power supplies is determined by:
    determining that the power status of one of the power supply has changed from the normal status to the abnormal status upon the condition that power status is changed from the first preset value to the second preset value during two sequential first time cycles; or
    determining that the power status of one of the power supply has changed from the abnormal status to the normal status upon the condition that power status is changed from the second preset value to the first preset value during two sequential first time cycles, and a previous power status of the power supply recorded in the BMC is the abnormal status.

17. The non-transitory storage medium according to claim 14, wherein the first preset value is represented by a digital "1", and the second preset value is represented by a digital "0".

18. The non-transitory storage medium according to claim 13, wherein the second time cycle is greater than the first time cycle.

19. The non-transitory storage medium according to claim 13, wherein the medium is selected from the group consisting of a hard disk drive, a compact disc, a digital video disc, and a tape drive.

* * * * *